July 9, 1940. J. CASALI ET AL 2,206,940
TOP AND SPINNER THEREFOR
Filed Sept. 14, 1939
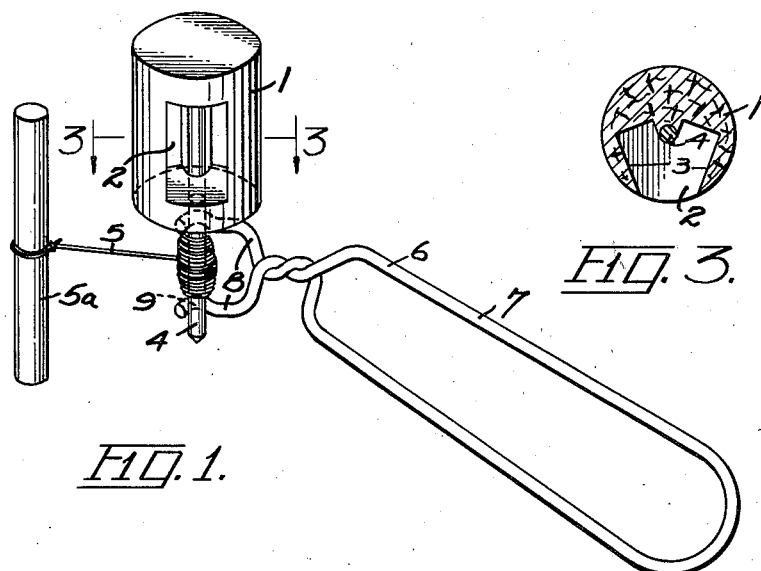
Fig. 1.
Fig. 3.
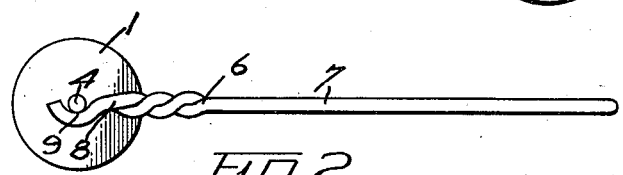
Fig. 2.
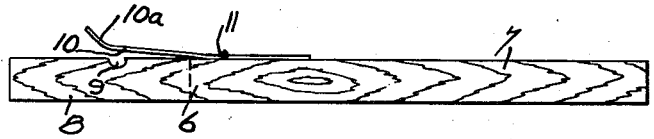
Fig. 4.
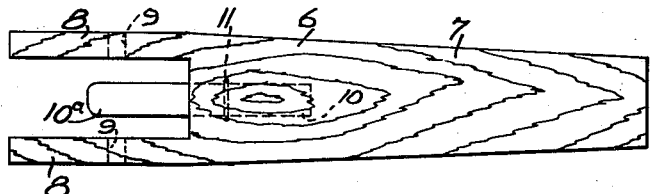
Fig. 5.
INVENTORS
Joseph Casali
Simon Ventura
BY
ATTORNEY.

Patented July 9, 1940

2,206,940

UNITED STATES PATENT OFFICE 2,206,940

TOP AND SPINNER THEREFOR

Joseph Casali and Simon Ventura, Detroit, Mich.

Application September 14, 1939, Serial No. 294,806

2 Claims. (Cl. 46—72)

This invention relates to improvements in tops and spinners therefor.

It is an object of the invention to provide a simple and inexpensive top which will hum when spun, and which is easy to spin on account of the provision of a simple spinner therefor.

Another object of the invention is to provide a top consisting of a circular solid body having an aperture formed laterally therein from one side intermediately of its height; the said aperture being of such cross section form that its cross sectional area is smallest at its mouth and being of inwardly increasing size so that it creates a humming sound when spun, and a stem projecting downwardly from the body coaxially with the body.

A further object of the invention is to provide a top having a relatively long, downwardly projecting stem around which a cord may be wound, and a spinner including two spaced and substantially parallel prongs against which the stem may be held as by a spring with the wound portion of the stem positioned between the prongs and the spring bearing against said wound portion, so that the cord may be readily pulled to spin the top.

Having thus briefly stated some of the objects and advantages of the invention we will now proceed to describe preferred embodiments thereof with the aid of the drawing, in which:

Figure 1 illustrates a perspective view showing the top and spinner with a cord wound around the stem of the top and the latter ready for spinning.

Figure 2 is an inverted plan view of Figure 1 showing the underside of the top and the spinner but neglecting the cord.

Figure 3 is a section on the line 3—3 of Figure 1.

Figures 4 and 5 are a top and side view respectively showing a modified form of spinner.

Referring to the drawing, 1 designates a solid, circular body, preferably made of wood or other similar material and of substantially uniform diameter throughout the major portion of its height. An aperture 2 is formed laterally in one side of the body 1 intermediately of its height; the vertical sides 3 of this aperture 2 are inwardly inclined from one another so that the said aperture is of smallest cross sectional area at its mouth and is of inwardly increasing width. Extending vertically and coaxially with the body 1 and through the latter is a pin or stem 4 which projects downwardly from said body.

The spinner 6 consists of a handle portion 7 having two spaced and substantially parallel prongs 8 extending from one extremity. This spinner may either consist of suitably flexed wire as shown in Figures 1 and 2, or of solid material, such as wood, as shown in Figures 4 and 5. In either case aligned grooves or recesses 9 are formed across the prongs 8 against which the stem 4 is adapted to be supported; and in the embodiment shown in Figures 4 and 5 a spring 10 is provided upon the handle 7 which extends between the prongs 8 and substantially parallel therewith.

When the top is to be spun a cord 5 is wound around the downwardly projecting portion of the stem 4, so that after this has been done the spaced prongs 8 of the spinner 6 may be placed against the said stem with the cord between them. The stem is then held against the recesses 9 in the said prongs 8 until the cord 5 is pulled. To simplify the handling of the latter the cord may be secured at one extremity to a bail 5a. The stem and top are then released and allowed to drop spinning to the floor, or other suitable surface. Then, due to the shape of the aperture 2, the top emits a humming sound while rotating upon its stem 4.

The purpose of the spring 10, shown in Figures 4 and 5, which is secured to the handle 7 by a suitable fastener 11, is to retain the stem against the prongs 8 and in the recesses 9 thereof until the cord 5 is pulled, when the stem 4 releases itself from the said spring so that the top drops onto the surface on which it is to spin. For this reason the free extremity of the spring 10 is outwardly flexed at 11 from the prongs 8. The provision of the spring 10 therefore simplifies the handling of the top as it makes the releasing of the stem practically automatic.

Having thus described our invention, what we claim is:

1. A spinner for tops comprising a handle portion, two spaced and substantially parallel prongs extending therefrom against which a stem of a top is adapted to be held, said prongs having aligned recesses formed therein to receive said stem, and a resilient member extending from said handle portion adapted to engage said stem between said prongs and hold said stem against the latter.

2. In combination, a top having a circular body and a stem coaxial therewith and projecting downwardly therefrom around which a cord is adapted to be wound, and a spinner consisting of a handle portion and spaced and substantially parallel prongs extending therefrom against which said stem is adapted to be held when the top is to be spun, and means on the spinner adapted to hold said stem against said prongs.

JOSEPH CASALI.
SIMON VENTURA.